Jan. 16, 1951  J. W. MEAKER ET AL  2,538,579
ELECTROPERFORATING APPARATUS
Filed Jan. 18, 1947  3 Sheets-Sheet 1

INVENTORS
CLARENCE H. McSHAN
JOHN W. MEAKER
BY
Burgess Ryan & Hicks
ATTORNEYS

Jan. 16, 1951  J. W. MEAKER ET AL  2,538,579
ELECTROPERFORATING APPARATUS

Filed Jan. 18, 1947  3 Sheets—Sheet 2

INVENTORS
CLARENCE H. McSHAN
JOHN W. MEAKER
BY
Burgess Ryan & Hicks
ATTORNEYS

Jan. 16, 1951  J. W. MEAKER ET AL  2,538,579
ELECTROPERFORATING APPARATUS
Filed Jan. 18, 1947  3 Sheets-Sheet 3
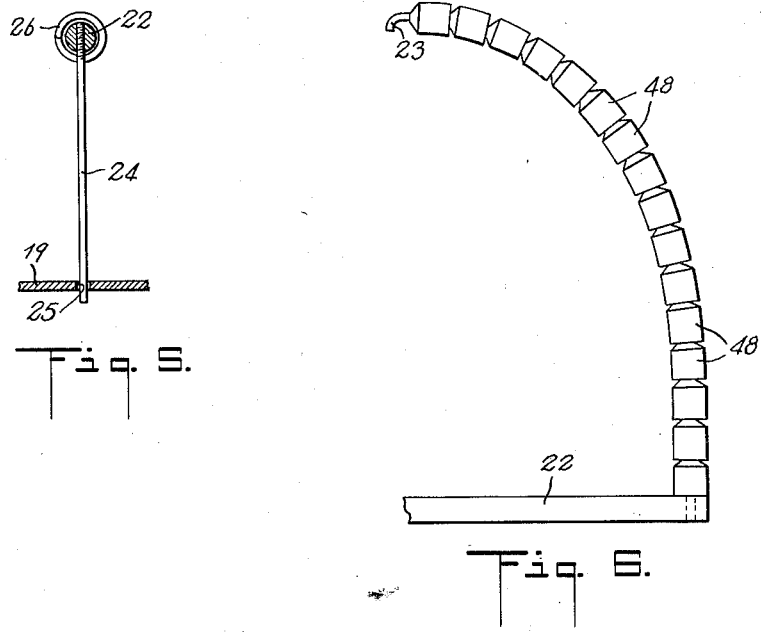
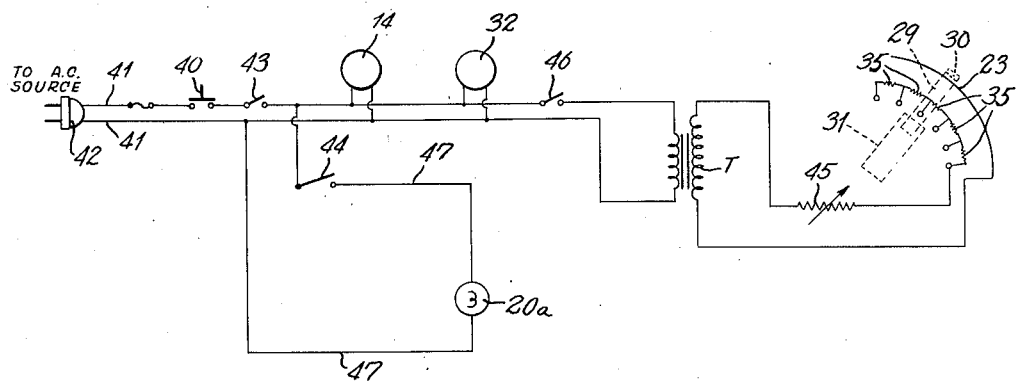
INVENTORS
CLARENCE H. MCSHAN
JOHN W. MEAKER
BY
Burgess Ryan & Hicks
ATTORNEYS Patented Jan. 16, 1951

2,538,579

UNITED STATES PATENT OFFICE 2,538,579

ELECTROPERFORATING APPARATUS

John W. Meaker, New York, N. Y., and Clarence H. McShan, Newark, N. J.; said McShan assignor to said Meaker Application January 18, 1947, Serial No. 722,852

17 Claims. (Cl. 219—19)

This invention relates to an electrical discharge apparatus and more particularly to an apparatus for perforating articles of various sizes and shapes by an electric discharge.

An object of this invention is to provide an apparatus for the electrical perforation of hats or similar articles that will accommodate various sizes of articles of the same general shape with an electrode assembly that will conform to the variations in the shape of an individual article. An apparatus incorporating such features eliminates the need for an individual electrode corresponding exactly in size and shape to the particular articles being treated. This gives the apparatus a greater range of application and at the same time reduces the cost of such equipment for the individual user.

Another object is to provide an electrical perforating apparatus by means of which uniform perforations are produced over the area of the article being treated. Other objects and advantages of the invention will be apparent from the following description and the accompanying drawings in which:

Fig. 5 is a section view taken along the line 5—5 of Fig. 2;

Fig. 6 is a side view of a modified form of electrode; and

Fig. 7 illustrates diagrammatically the wiring connections for the apparatus embodying the invention.

Figure 1:
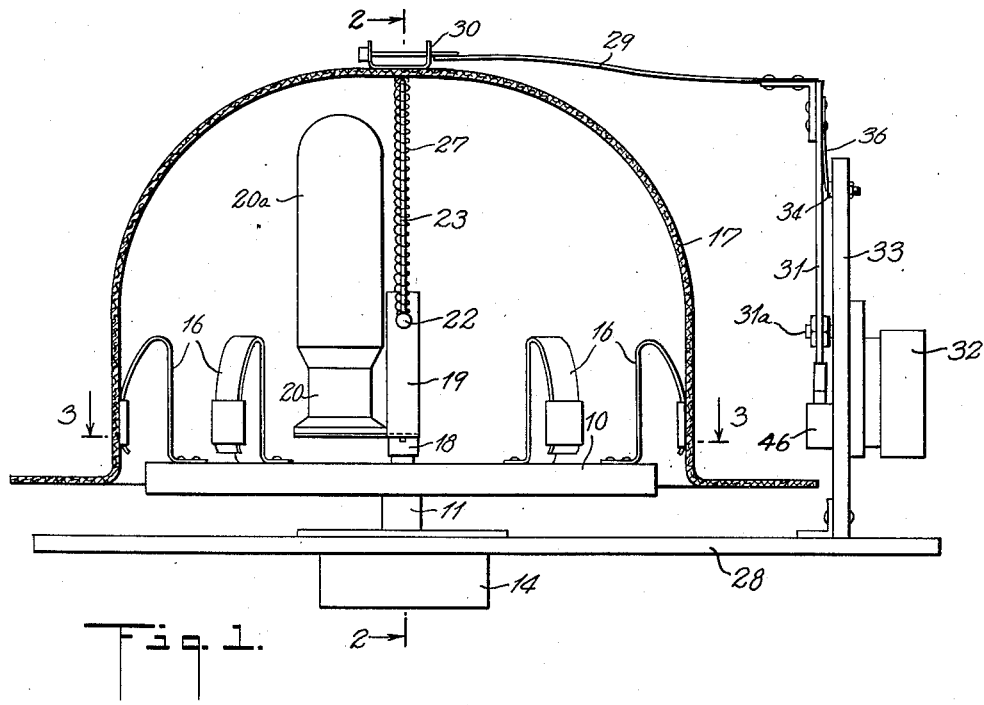
Fig. 1 is a side elevation view of an apparatus embodying the invention with the hat being treated thereon being shown in section.
Figure 2:
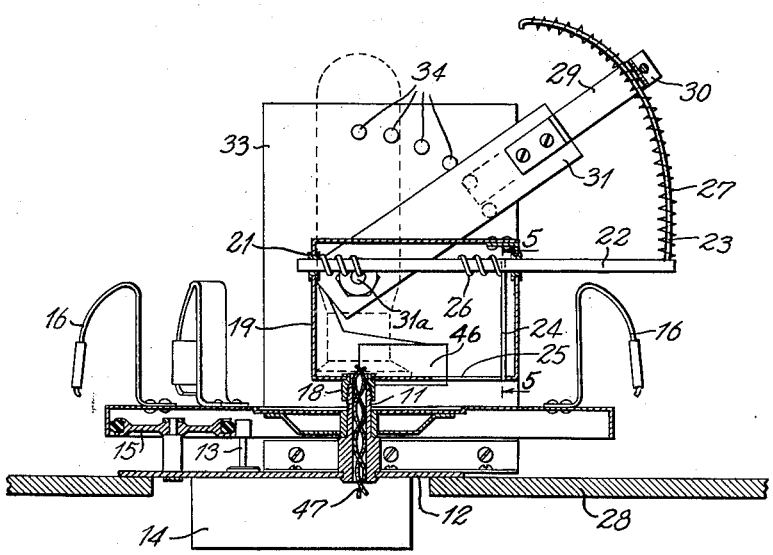
Fig. 2 is a section view taken along the line 2—2 of Fig. 1 having the hat omitted for clarity.
Figure 4:
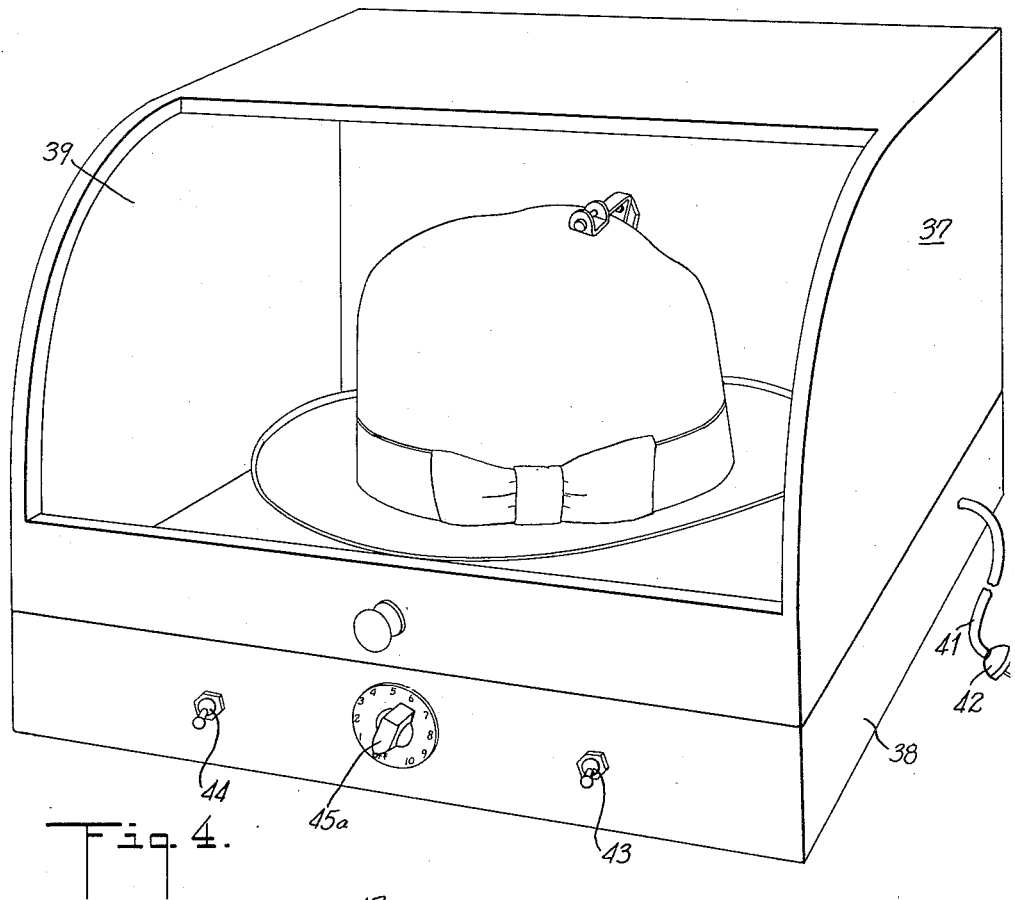
Fig. 4 is a perspective view of an apparatus embodying the invention.
Figure 3:
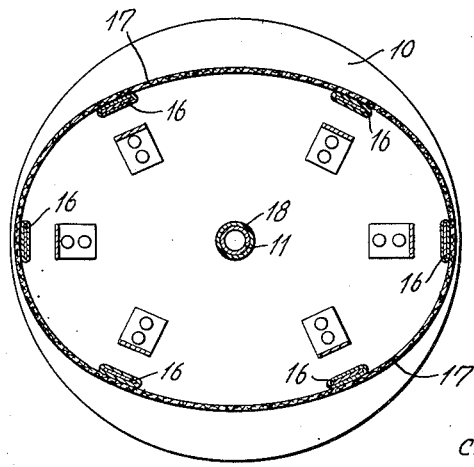
Fig. 3 is a section view taken along the line 3—3 of Fig. 1.

Referring to the drawings in detail, there is a turntable 10 rotatably mounted on a stationary shaft 11 supported on a plate 12. The turntable 10 may be driven in any suitable manner. As shown in Fig. 2, a shaft 13 of a motor 14 engages with a rubber tired wheel 15 rotatably mounted on the plate 12. The rubber tired wheel 15 engages with the inside of the rim of the turntable 10 so that when the wheel is driven by operation of the motor 14, it drives the turntable.

The turntable 10 has a series of resilient members in the form of spring fingers 16 spaced about its outer edges. When the apparatus is designed for use particularly with a hat, the spring fingers 16 may be arranged in an elliptical or oval pattern on the turntable so that they will conform generally to the shape of a hat 17. Thus, when the hat is placed over the spring fingers, the spring fingers resiliently press against the crown of the hat and secure the hat to the turntable. The spring fingers 16 because of their resiliency will accommodate a variety of hat sizes ranging from the largest to the smallest sizes ordinarily produced.

The end of the shaft 11 extends above the turntable and carries a bushing 18 on its end. An electrode support 19 and an electric lamp socket 20 containing a lamp 20a are supported in fixed position on the bushing 18. The support 19 is in the form of a rectangular frame having oppositely disposed openings at the upper ends of its vertical sides in which bearings 21 are secured. Slidably mounted in the bearings 21, there is a rod or shaft 22 extending transversely across the support 19 and carrying a vertically extending, flexible electrode 23 at its outer end. A guide 24 extends downwardly from the shaft 22 into a slotted opening 25 in one of the horizontal members of the support 19. This guide prevents the shaft 22 from turning and thus holds the electrode 23 in vertical position. The guide also limits the movement of the shaft 22 in the frame 19. A spring 26 surrounding the shaft 22 engages with the frame 19 and the guide 24 and resiliently urges the shaft 22 and the electrode 23 outwardly.

The flexible electrode 23 may be slightly curved to conform generally to the contour of the hat. However, flexibility of the electrode 23 permits it to conform readily to the outline or contour of the crown of the hat when it is pressed against the inside of the hat. The spring 26 also holds the electrode in engagement with the interior surface of the hat as it rotates regardless of changes in conformation. For example, as a hat is rotated, the shaft 22 moves inwardly or outwardly, as the case may be, under the influence of the spring 26 following the oval shape of the hat. The flexible electrode 23 may be surrounded by an auxiliary discharge receiving member in the form of a coiled spring 27. The coiled spring 27 conforms to the shape of the electrode itself and may be replaced when worn. This electrode assembly is electrically grounded so that it is in effect electrically connected to the grounded side of the secondary or high voltage side of a transformer T. The plate 12 on which the turntable is rotatably mounted is in turn supported on a panel 28.

Acting in conjunction with the flexible electrode positioned inside of the hat to complete a discharge circuit, there is a movable electrode 30 bearing against the outer surface of the hat in opposed relation to the inner electrode. The electrode 30 is carried at one end of a flexible arm 29 and is swively mounted thereon so that it will assume a position normal to the opposing electrode as it moves over the surface of the hat. The flexible arm 29 carrying the electrode 30 is supported on an arm 31 of insulating material which is mounted on and driven through a suitable slip connection by a shaft 31a that is in turn driven by a motor 32. The motor 32 and the shaft 31a are supported by a vertical panel 33 mounted on the bottom panel 28. The vertical panel 33 also carries contacts 34 connected to a series of resistances 35. The resistances 35 are in turn connected in series to the secondary of the transformer T. A contact wiper 36 carried by the arm 31 is electrically connected to the moving electrode 30 through the arm 29 and travels across the contacts 34 as the arm 31 is rotated.

The contacts 34 are connected to the resistances 35 so that when the driven arm is in approximately a vertical position (with the electrode 30 positioned approximately over the center of the hat crown) the resistance in the discharge circuit will be at a maximum and when the arm reaches its outward limit of movement (a position where the speed at which the hat rotates between the electrodes does not vary materially as the arm continues to move), the resistance in the circuit is at a minimum. It has been found that by regulating the current intensity of the electric discharge between the electrodes in this manner, it is possible to secure substantially uniformly sized perforations in the article being treated despite variations in the speed at which the hat passes between the electrodes.

In a given material the size of perforations caused by an electric discharge will depend on factors such as the speed at which the material passes between the electrodes; the frequency of the alternating current; the current intensity of the spark discharge; the number of spark discharges passing through a given perforation and other factors. While in an apparatus of the type described here, most of these factors are more or less fixed, the speed at which the material passes between the electrodes may vary. For example, the speed at which a hat being rotated moves between the electrodes varies from a minimum at the center of the hat to a maximum at the outer edge. In order to compensate for this difference in speed, the current intensity of the spark discharge between the electrodes may be regulated in the manner just described so as to produce uniform perforations over the surface of the hat.

As the motor 32 drives the arm 31 towards the end of its travel, the arm operates a limit switch 46, which controls the circuit to the transformer, to open the limit switch thereby preventing further discharge between the electrodes. As previously stated, the shaft 31a drives the arm 31 through a suitable slip drive, such as a slip drive bushing, and this permits the machine to run after perforation has been completed without damage to the outside electrode or the motor 32. The motor 32 driving the shaft 31a may be connected thereto by a magnetic clutch that is separately controlled so that only when the entire machine is shut off, the arm 31 may be manually moved to its starting position for the next cycle of operation.

For convenience, portability and safety the entire apparatus may be placed inside of a case having a cover 37 hinged on a base 38. The cover 37 may have a window 39 through which the apparatus may be viewed as its operations are carried on. A control switch 40 may be provided which is operated by the cover so that when the cover is raised, the entire apparatus is disconnected and inoperative. When the cover 37 has been raised disconnecting the apparatus, the operator may remove an article that has been treated and place an article to be treated on the turntable and at the same time the operator may raise the arm 31 by hand to its top position without danger. The panel 28 forms the top of the base 38 and the wiring, transformer and other parts may be enclosed in the base. A double electrical conductor 41 with a conventional electric plug 42 leading from the base may be provided for convenient connection to an electrical power outlet.

An operating switch 43, a lamp switch 44 and a control knob 45a for a variable resistance 45 are mounted on the base and are accessible from the exterior thereof. When the cover 37 is down so that the control switch 40 is closed, the operating switch 43 may be closed to connect the turntable motor 14, the electrode arm moving motor 32 and the primary of the transformer T to a suitable source of alternating current through the wires 41 and the plug 42. The variable resistance 45 is connected between the secondary of the transformer T and the series of resistances 35 and may be adjusted to control the intensity of the spark discharge as required for the perforation of a given material.

The switch 44 controls a circuit from the lamp 20a located inside of the hat to the wires 41 through wires 47. This lamp may be lighted as the apparatus operates to permit visible inspection of the perforations being made. The limit switch 46 which is in the circuit with the primary of the transformer T and controlled by the movement of the arm 31 is preferably arranged in an apparatus, such as shown here, to close the circuit to the primary of the transformer after the first five degrees of travel of the arm and to open it during the last five degrees of travel of the arm. This permits the turntable to reach its normal speed before a discharge between the electrodes occurs and prevents continued operation after the arm has reached its limit of travel.

A modified form of member surrounding the flexible electrode 23 is shown in Fig. 6. This electrode consists of a series of hardened steel rollers 48 rotatably mounted on the arm. This may be used where it is found desirable in some cases to reduce the friction between the article being perforated and the fixed electrode as the hat or other article rotates.

In the foregoing description and drawings, a preferred embodiment of the invention has been shown as being incorporated in an apparatus particularly adapted for the electro-perforation of hats. It will be understood that the invention may similarly be incorporated in an apparatus for electro-perforating any desired article in a range of sizes or shapes. It will also be understood by those skilled in the art that various changes and modifications may be made in the apparatus without departing from the scope of the invention as defined by the following claims.

We claim:

1. In an apparatus for perforating articles of various sizes and irregular shape by an electric discharge, the combination of a rotatable member, means carried by said rotatable member for securing an article to be perforated to said rotatable member, said means being capable of securing various sizes of said articles to said rotatable member, a fixed electrode support extending through said rotatable member, a flexible electrode slidably mounted on said support, a resilient member urging said electrode into engagement with the inner surface of the article carried by said rotatable member, a second electrode contacting the opposite surface of said article at a point in opposed relation to the first mentioned electrode, and driving mechanism for moving said second electrode across the surface of the article in opposed relation to the first electrode.

2. In an apparatus for perforating articles of various sizes and irregular shape by an electric discharge, the combination of a rotatable member, means carried by said rotatable member for securing an article to be treated to said rotatable member, said means being capable of securing various sizes of said articles to said rotatable member, a fixed electrode support extending through said rotatable member, a flexible electrode slidably mounted on said support, a resilient member urging said electrode into engagement with the inner surface of the article carried by said rotatable member, a second electrode contacting the surface of said article at a point in opposed relation to the first mentioned electrode, driving mechanism for moving said second electrode across the surface of the article in opposed relation to the first electrode, and a motor for rotating the rotatable member and passing the article carried thereon between said electrodes.

3. In an apparatus for perforating articles of various sizes and irregular shape by an electric discharge, the combination of a rotatable member, means carried by said rotatable member for securing an article to be treated to said rotatable member, said means being capable of securing various sizes of said articles to said rotatable member, a fixed electrode support extending through said rotatable member, a flexible electrode slidably mounted on said support, a resilient member urging said electrode into engagement with the inner surface of the article carried by said rotatable member, a second electrode contacting the surface of said article at a point in opposed relation to the first mentioned electrode, driving mechanism for moving said second electrode across the surface of the article in opposed relation to the first electrode, a motor for rotating the rotatable member and passing the article carried thereon between said electrodes, and means for passing an electric discharge between said electrodes and through said article.

4. In an apparatus for perforating articles of various sizes and irregular shape by an electric discharge, the combination of a rotatable member, means carried by said rotatable member for securing an article to be treated to said rotatable member, said means being capable of securing various sizes of said articles to said rotatable member, a fixed electrode support extending through said rotatable member, a flexible electrode slidably mounted on said support, a resilient member urging said electrode into engagement with the inner surface of the article carried by said rotatable member, a second electrode contacting the surface of said article at a point in opposed relation to the first mentioned electrode, driving mechanism for moving said second electrode across the surface of the article in opposed relation to the first electrode, a motor driving the rotatable member and passing the article carried thereon between said electrodes, means for passing an electric discharge between said electrodes and through said article, and means for controlling the current density of said discharge depending on the radial position of the second-mentioned electrode with respect to said rotatable member to secure uniformly sized perforations in said article.

5. In an apparatus of the class described having a rotatable member for passing an article to be perforated between a pair of electrodes, the combination of a series of resilient members carried by said rotatable member, said resilient members being capable of engaging with individual articles of various sizes to secure said articles to the rotatable member, a flexible electrode supported above said rotatable member in fixed angular relation thereto, said electrode being movable radially and resiliently held in engagement with the inner surface of said article and a second electrode contacting the outer surface of said article at a point opposite the first electrode, and means for moving said second electrode across the surface of said article in opposed relation to the first electrode.

6. In an apparatus of the class described having a rotatable member for passing an article to be perforated between a pair of electrodes, the combination of a series of resilient members carried by said rotatable member, capable of engaging with articles of various sizes to secure an individual article to said rotatable member, a flexible electrode supported above said rotatable member in fixed angular relation thereto, said electrode being movable radially and resiliently held in engagement with the inner surface of said article, a second electrode, said electrode being carried on an elongated flexible arm resiliently urging said electrode in contact with the opposite surface of said article at a point in opposed relation to the first electrode, a support on which said arm is pivotally mounted, and a driving mechanism for moving said arm and thereby passing the electrode carried thereon across the surface of the article being perforated in opposed relation to the first electrode.

7. In an apparatus of the class described having a rotatable member for passing an article to be perforated between a pair of electrodes, the combination of a series of resilient members carried by said rotatable member capable of engaging with articles of various sizes to secure an individual article to said rotatable member, a flexible electrode supported above said rotatable member in fixed angular relation thereto, said electrode being movable radially and resiliently held in engagement with inner surface of said article, a second electrode, said electrode being carried on an elongated flexible arm resiliently urging said electrode in contact with the opposite surface of said article at a point in opposed relation to the first electrode, a support on which said arm is pivotally mounted, a motor driving said arm thereby moving the electrode carried thereon across the surface of the article being perforated in opposed relation to the first electrode, a source of high voltage current connected to said electrodes and means for regulating the current applied to said electrodes in accordance with the speed at which the article passes therebetween.

8. In an apparatus of the class described, the combination of a rotatable member for passing an article to be perforated between a pair of electrodes, a series of resilient members carried by said rotatable member, said resilient members being capable of engaging with articles of various sizes to secure an individual article to the rotatable member, a flexible electrode resiliently held in engagement with the inner surface of said article, a second electrode, said electrode being carried on an elongated flexible arm resiliently urging said electrode in contact with the outer surface of said article at a point in opposed relation to the first electrode, a support on which said arm is pivotally mounted, a driving mechanism for moving said arm and thereby passing the electrode carried thereon across the surface of the article being perforated in opposed relation to the first electrode, a source of high voltage current connected to said electrodes, and means for regulating the current applied to said electrodes in accordance with the speed at which the article passes therebetween, said means comprising a variable resistance connected in the circuit to the second electrode, the value of said resistance being controlled by the movement of said second electrode.

9. In an apparatus of the class described, the combination of a rotatable member, resilient members carried by said rotatable member, said resilient members being capable of engaging with and securing articles of different sizes to said rotatable member, a fixed electrode support extending through said rotatable member, a flexible electrode slidably carried by said support, the flexibility of said electrode permitting said electrode to conform to the inner contour of the article carried by said rotatable member, a resilient member maintaining said electrode in engagement with said article during its rotation regardless of variations in the shape of said article, and a movable electrode contacting an opposite surface of said article at a point in opposed relation to the first electrode, and a drive for moving said second electrode across the surface of said article in opposed relation to the first electrode as the article is rotated between the electrodes.

10. In an apparatus of the class described, the combination of a rotatable member, resilient members carried by said rotatable member, said resilient members being capable of engaging with and securing articles of different sizes to said rotatable member, a fixed electrode support extending through said rotatable member, a flexible electrode slidably carried by said support, the flexibility of said electrode permitting said electrode to conform to the inner contour of the article carried by said rotatable member, a resilient member maintaining said electrode in engagement with said article during its rotation regardless of variations in the shape of said article, a movable electrode contacting an opposite surface of said article at a point in opposed relation to the first electrode, a drive for moving said second electrode across the surface of said article in opposed relation to the first electrode, a source of high voltage current connected to said electrodes and a variable resistance for regulating the current supplied to said electrodes, said resistance being controlled by the movement of the movable electrode.

11. In an apparatus of the class described where an article to be perforated is rotated so as to pass between a pair of electrodes, one of said electrodes being moved across the surface of said article in opposed relation to the other electrode, means for regulating the current intensity of an electrical discharge passing between the electrodes and through the article to secure uniformly sized perforations in said article, said means comprising a series of resistances connected in series to one side of a source of electrical energy and a conductor carried by and connected to the movable electrode contacting with said resistances as said electrode is moved, said conductor contacting the resistance at a maximum value when the speed at which the article moves between the electrodes is lowest and at a minimum value when the speed at which the article moves between the electrodes is greatest.

12. In an apparatus for electrically perforating a hat, the combination which includes a rotatable turntable for supporting a hat, an electric motor having a driving connection to said turntable, a flexible electrode located inside of the hat, means for moving and supporting said electrode into conforming engagement with the inner surface of the hat, a second electrode engaging with the outer surface of the hat, said electrode being movable across the surface of the hat, driving means connected to said second electrode for moving it across the outer surface of the hat in opposing relation to the first-mentioned electrode, means for supplying a high voltage electric current to the electrodes, said current being capable of passing an electric arc discharge between the electrodes and through the hat and a circuit connecting the last-mentioned means and the electric motor for driving the turntable to a source of electrical energy, said circuit including switching means operable by the movement of the second electrode for opening said circuit upon completion of the movement of the second electrode across the surface of the hat in one direction.

13. In an apparatus for electrically perforating a hat, the combination which includes a rotatable turntable for supporting a hat thereon, electrically operable means for rotating the turntable and the hat, a flexible electrode located inside of the hat, means for moving and supporting said electrode into conforming engagement with the inner surface of the hat, a second electrode, a movable, flexible arm supporting said second electrode in contact with the outer surface of the hat, means for moving said arm and the second electrode supported thereon across the outer surface of the hat in opposing relation to the first-mentioned electrode, means for supplying a high voltage electric current to the electrodes, said current being capable of passing an electric arc discharge between the electrodes and through the hat and a circuit connecting the last-mentioned means and the turntable rotating means to a source of electrical energy, said circuit including switching means operable by movement of the second electrode for opening said circuit upon completion of the movement of the second electrode across the outer surface of the hat in one direction.

14. In an apparatus for electrically perforating a hat, the combination which includes a rotatable turntable for supporting a hat thereon, electrically operable means for rotating the turntable and the hat, a flexible electrode located inside of the hat, means for moving and supporting said electrode into conforming engagement with the inner surface of the hat, a second electrode, a movable flexible arm supporting said second electrode in contact with the outer surface of the hat, means for moving said arm and the electrode thereon across the outer surface of the hat in opposing relation to the first-mentioned electrode, means for supplying a high voltage electric current to said electrodes, said current being capable of passing an electric arc discharge between the electrodes and through the hat, a circuit connecting the last-mentioned means and the turntable rotating means to a source of electrical energy, said circuit including switching means operable by movement of the second electrode for opening said circuit upon completion of the movement of the second electrode across the outer surface of the hat in one direction, and means in said circuit for varying the intensity of the arc discharge passing between the electrodes and through the hat.

15. In an apparatus for electrically perforating a hat wherein a hat having a flexible electrode located inside thereof and engaging with its inner surface is supported on a rotatable turntable and an electric motor is connected to the turntable for rotating the same, the combination which includes a movable, flexible arm, an electrode carried by and held in engagement with the outer surface of the hat by said arm, said electrode contacting with the hat at a point where said electrode is opposed to an electrode located inside of the hat, means for moving said arm and the electrode carried thereon across the outer surface of the hat and a circuit connecting said electrodes and the turntable motor to a source of electrical energy, said circuit including transformer means for supplying a high voltage current to the electrodes and switching means operable by said arm to open said circuit upon completion of the movement of the electrode supported on the arm across the outer surface of the hat in one direction.

16. In an apparatus for electrically perforating a hat wherein a hat having a flexible electrode located inside thereof and engaging with its inner surface is supported on a rotatable turntable and an electric motor is connected to the turntable for rotating the same, the combination which includes a flexible arm, an electrode carried by and held in engagement with the outer surface of the hat by said arm, said electrode engaging with the outer surface of the hat at a point where said electrode is opposed to an electrode located inside of the hat, means for moving said arm and the electrode carried thereon across the outer surface of the hat and a circuit connecting said electrodes and the turntable motor to a source of electrical energy, said circuit including transformer means for supplying a high voltage current to the electrodes, means for regulating the current supplied to the electrodes, and switching means operable by said arm to open said circuit upon completion of the movement of the electrode supported on the arm across the outer surface of the hat in one direction.

17. In an apparatus for perforating an article of wearing apparel having an irregularly shaped recess therein such as a hat by an electrical arc discharge, the combination of a rotatable member supporting the article to be perforated, a flexible electrode located within an irregularly shaped recess in said article, means for moving said electrode into contour conforming engagement with the inner surface of the recess in the article, a second electrode, a supporting means resiliently holding said second electrode in engagement with the outer surface of the article in opposing relation to a portion of the first-mentioned electrode, means for moving said supporting means and the second electrode across the outer surface of the article in opposing relation to other portions of the first-mentioned electrode, means for supplying a high-voltage, pulsating current to said electrodes, said current being capable of creating an electrical arc discharge between said electrodes and through the article and means for regulating the intensity of the discharge between the electrodes.

JOHN W. MEAKER.
CLARENCE H. McSHAN.

REFERENCES CITED

The following references are of record in the file of this patent:

UNITED STATES PATENTS

| Number | Name | Date |
| --- | --- | --- |
| 619,874 | Dietrich | Feb. 21, 1899 |
| 1,017,009 | McKinless | Feb. 13, 1912 |
| 1,016,716 | Smith | Feb. 6, 1912 |
| 1,068,774 | Hutchison | July 29, 1913 |
| 1,250,140 | Chapman | Dec 18, 1917 |
| 2,011,645 | Miller | Aug. 20, 1935 |
| 2,141,869 | Konig | Dec. 27, 1938 |
| 2,215,411 | Sebring | Sept. 17, 1940 |
| 2,365,576 | Meaker et al. | Dec. 19, 1944 |
| 2,385,246 | Wilsey et al. | Sept. 18, 1945 |